United States Patent

[11] 3,628,851

| [72] | Inventor | Harry J. Robertson |
| | | Woodland Road, Salisbury, Md. 21801 |
| [21] | Appl. No. | 852,194 |
| [22] | Filed | Aug. 22, 1969 |
| [45] | Patented | Dec. 21, 1971 |

[54] WIDE ANGLE REAR VIEW MIRROR
1 Claim, 3 Drawing Figs.

[52] U.S. Cl. .................................................. 350/293,
350/303
[51] Int. Cl. ..................................................... G02b 5/10
[50] Field of Search ........................................... 350/293,
299, 303, 307

[56] References Cited
UNITED STATES PATENTS
| 2,279,751 | 4/1942 | Hensley | 350/303 |
| 2,514,989 | 7/1950 | Buren | 350/303 X |

FOREIGN PATENTS
| 1,011,740 | 12/1965 | Great Britain | 350/310 |
| 1,094,948 | 12/1967 | Great Britain | 350/303 |
| 1,368,579 | 6/1964 | France | 350/303 |

*Primary Examiner*—David Schonberg
*Assistant Examiner*—John W. Leonard
*Attorney*—Newton, Hopkins & Ormsby

ABSTRACT: A rear view mirror for mounting on a vehicle, the mirror having two planar mirror sections joined by an arcuate section so that a vehicle approaching the rear of the driven vehicle on which the mirror is mounted can be observed continuously as the approaching vehicle approaches the driven vehicle with the mirror until it is abreast of the driven vehicle.

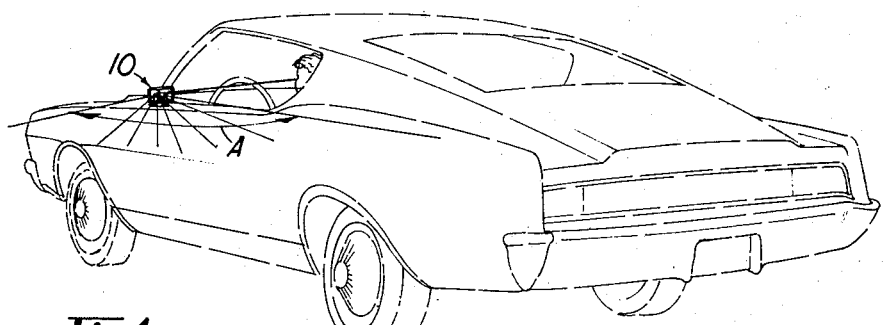
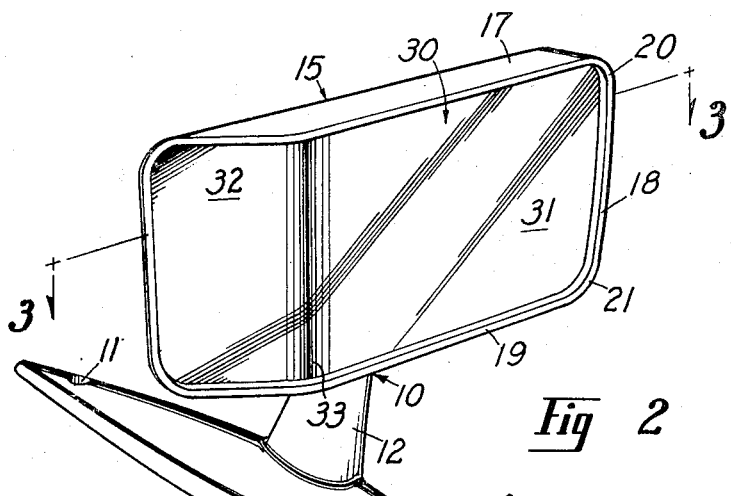
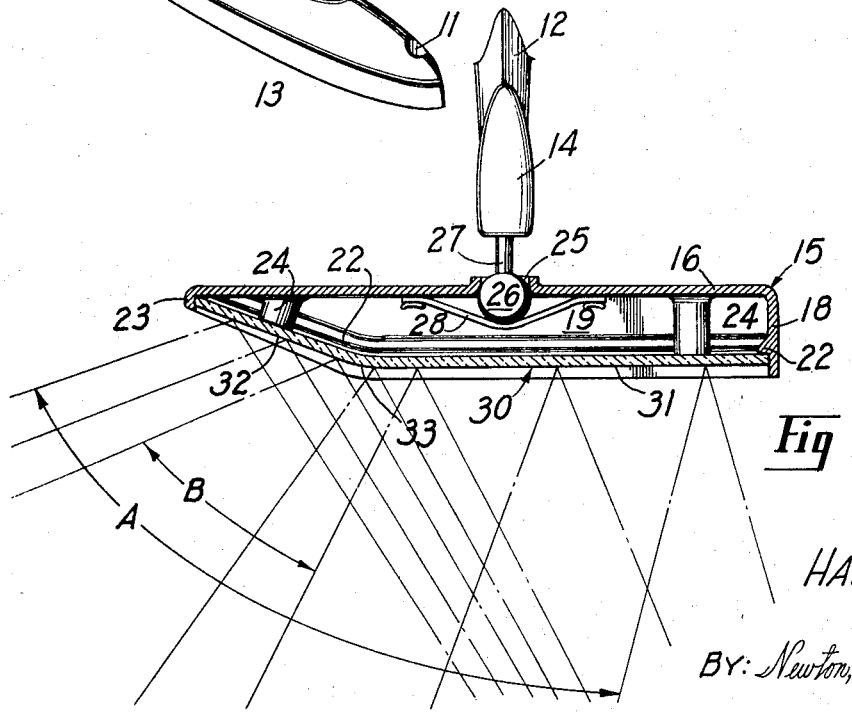
INVENTOR
HARRY J. ROBERTSON
BY: Newton, Hopkins, & Ormsby
ATTORNEYS

WIDE ANGLE REAR VIEW MIRROR

BACKGROUND OF THE INVENTION

1. Field of the Invention

This invention relates to rear view mirrors for vehicles and is more particularly concerned with a mirror for observing an approaching vehicle continuously from a position astern of the driven vehicle mounting the mirror to a position abreast of the vehicle mounting the mirror.

2. Discussion of the Prior Art

It is desirable to allow a driver of a vehicle to continuously observe another vehicle approaching from the rear of the driven vehicle. Attempts have been made using various rear view mirror designs to provide observation of the vehicle approaching from the rear until the approaching vehicle is within the peripheral vision of the driver. Since the approaching vehicle is not within the peripheral vision of the driver until it reaches a position abreast the driven vehicle, a rear view mirror having a single flat planar reflecting surface was not adequate. Attempts have been made to alleviate this problem using a plurality of flat planar reflecting surfaces adjustable with respect to each other or a constantly curving reflecting surface across a major portion of the total reflecting surface. The multiple flat planar mirrors do not fully alleviate the problem since undesirable blind spots are in the field of view along the juncture of adjacent planar surfaces. The curved mirrors also do not fully alleviate the problem since the curved reflecting surface produces undesirable distortions in a large portion of the field of view.

SUMMARY OF THE INVENTION

These and other problems and disadvantages associated with the prior art are overcome by the invention disclosed herein by providing a mirror having a reflecting surface for the driver of a vehicle to continuously observe another vehicle approaching from the rear of the vehicle until it reaches the peripheral vision of the driver with a minimum of distortion.

Briefly described, the present invention includes a continuous reflecting surface having two angularly related reflecting subsurfaces over a major portion of the total reflecting surface connected by a vertically extending, relatively narrow, arcuate subsurface; and a casing supporting the mirror. By such an arrangement, a vehicle approaching the driven vehicle mounting the compound mirror of the present invention can be observed continuously from the time it is behind the driven vehicle until the time it is abreast of the driven vehicle. Since the arcuate subsurface is narrow, the distortion caused thereby is minimized.

These and other features and advantages of the invention disclosed herein will become more clearly understood upon consideration of the following detail description and accompanying drawings wherein like characters of reference designate corresponding parts throughout the several views and wherein:

BRIEF DESCRIPTION OF THE DRAWINGS

FIG. 1 is a perspective view of a vehicle mounting the rear view mirror of the present invention;

FIG. 2 is an enlarged perspective view of the rear view mirror shown in FIG. 1; and, FIG. 3 is a horizontal sectional view of the rear view mirror taken along line 3—3 in FIG. 2.

These figures and the following detail description of the invention disclose a specific embodiment thereof, however, the inventive concept is not limited thereto since it may be embodied in other forms.

DETAILED DESCRIPTION OF ILLUSTRATIVE EMBODIMENT

Referring now in detail to the embodiment chosen for the purpose of illustrating the present invention, numeral 10 in FIGS. 2, and 3, denotes generally the rear view mirror constructed in accordance to the present invention. It will be understood by those skilled in the art that mirror 10 includes a base 13 provided with appropriate holes 11 in order that the base may be bolted in the conventional manner to the side of vehicle. Preferably the base 13 is bolted to the side of the vehicle adjacent the window so that the rear view mirror 10 may be observed through the side window of the vehicle. Projecting outwardly from the base 10 is a supporting post 12 which supports a laterally extending arm 14 in a position approximately parallel and outwardly of the base 13.

A casing 15 is provided having a flat backplate 16 and an enclosing wall including a top wall 17, a vertical sidewall 18, and a bottom wall 19. The top wall 17 and bottom walls 19 extend parallel to each other and perpendicular to the end wall 18. The walls 17 and 18 are joined along an arcuate portion 20 and the walls 18 and 19 are joined along an arcuate portion 21.

A shoulder 22, seen in FIG. 3, extends from the inside surface of the walls 17, 18, and 19, to form an abutment spaced inwardly from the outer edges of these walls. The free ends of walls 17 and 19 taper arcuately inwardly so as to merge with a side flange 23 at the outer end of the backplate 16. The shoulder 22 and flange 23 support a mirror 30 along its edges. The mirror 30 is secured to backplate 16 by means of posts 24.

The backplate 16 defines a centrally located aperture 25 therethrough provided with a bearing surface on the inside thereof. A ball 26 having a diameter larger than aperture 25 is positioned inside casing 15 adjacent aperture 25. Ball 26 is mounted in conventional manner on arm 14 by a connector 27 extending through aperture 25. A leaf spring 28 is attached to plate 16 on opposite sides of aperture 25 and extends across aperture 25 behind ball 26 to urge ball 26 into position against the bearing surface of aperture 25. Thus, a swivel connection is provided between base 13 and mirror 30.

According to the present invention, the mirror 30 includes a pair of planar surfaces denoted generally by numerals 31 and 32, the planar surfaces converging toward each other and merging along an arcuate central segment 33 which curves about a vertical axis inwardly of the mirror 30. While, preferably, the mirror 30 is made of glass which receives a continuous reflective coating along the inner surface thereof, it will be understood by those skilled in the art that the mirror 30 may also be made of other reflective materials such as polished metal, if so desired.

As seen from FIG. 3, the angle defining the total field of vision by the driver is designated A while the angle defining the field of vision from segment 33 is designated B. Since the major portion of the total field of vision is seen in planar surfaces 31 and 32 which are undistorted, the driver can observe the approaching vehicle continuously with a minimum distortion caused by segment 33.

It is to be further understood that the mirror 30 may be any desired shape such as a round mirror as long as the curved reflecting surface thereof produces an image in only a minor portion of the total field of vision.

While a specific embodiment of the invention has been described herein, it is to be understood that substitutions, modifications and equivalents may be used without departing from the scope of the inventive concept.

What is claimed as invention:

1. A rear view mirror for a vehicle comprising a support and a mirror portion mounted thereon; said mirror portion including a pair of planar sections disposed angulary with respect to each other and a central portion extending between and joining adjacent edges of said planar sections said central portion being integral with said planar sections and presenting with them a continuous reflecting surface and said central portion being of sufficient extent to present to the driver of the vehicle on which said mirror is mounted an image of an approaching vehicle while said vehicle is in a position between that in which its image appears on one of said planar surfaces and that in which it appears on the other such surface, whereby when said mirror is mounted on a vehicle as a rear view mirror, a vehicle approaching from the rear may be observed continuously until it comes abreast of the mirror, said mirror support including a backplate having top and bottom walls projecting therefrom, a sidewall joining said top and bottom walls at one end of said plate, a flange along the edge of said plate opposite said sidewall, and a continuous shoulder formed along said top, bottom and sidewalls; one of the planar sections of the mirror resting against said shoulder and the outer edge of the other planar section resting against said flange, the planar sections of the mirror being joined to the backplate by means of posts, said backplate being provided on the side toward the mirror with a seat, a ball mounted in said seat, a supporting post, a connector on said supporting post supporting said ball, and a leaf spring having its ends secured to said backplate and its central portion bearing against said ball.

* * * * *